(12) United States Patent
Grubka

(10) Patent No.: US 9,493,954 B2
(45) Date of Patent: Nov. 15, 2016

(54) UNDERLAYMENT WITH SLIP-RESISTANT SURFACE

(71) Applicant: Owens Corning Intellectual Property, LLC, Toledo, OH (US)

(72) Inventor: Lawrence J. Grubka, Westerville, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 56 days.

(21) Appl. No.: 14/265,419

(22) Filed: Apr. 30, 2014

(65) Prior Publication Data

US 2014/0255650 A1  Sep. 11, 2014

Related U.S. Application Data

(62) Division of application No. 12/892,629, filed on Sep. 28, 2010, now abandoned.

(60) Provisional application No. 61/246,203, filed on Sep. 28, 2009.

(51) Int. Cl.
| | |
|---|---|
| *E04D 7/00* | (2006.01) |
| *B32B 5/16* | (2006.01) |
| *B32B 11/10* | (2006.01) |
| *B32B 11/12* | (2006.01) |
| *E04D 12/00* | (2006.01) |

(52) U.S. Cl.
CPC ............... *E04D 7/005* (2013.01); *B32B 5/16* (2013.01); *B32B 11/10* (2013.01); *B32B 11/12* (2013.01); *E04D 12/002* (2013.01); *Y10T 156/1092* (2015.01); *Y10T 428/24372* (2015.01); *Y10T 428/24893* (2015.01)

(58) Field of Classification Search
CPC .............................................. Y10T 428/24893
See application file for complete search history.

(56) References Cited

U.S. PATENT DOCUMENTS

| | | | |
|---|---|---|---|
| 2,326,724 A | 8/1943 | George et al. |
| 3,616,143 A | 10/1971 | Langlois |
| 3,622,445 A | 11/1971 | Heidweiller |
| 3,753,826 A | 8/1973 | Plummer |
| 3,759,736 A | 9/1973 | Jenny et al. |

(Continued)

FOREIGN PATENT DOCUMENTS

| | | |
|---|---|---|
| WO | 94/25180 | 11/1994 |
| WO | 98/31537 | 7/1998 |

(Continued)

OTHER PUBLICATIONS

Office action from U.S. Appl. No. 11/238,371 dated Nov. 25, 2008.

(Continued)

*Primary Examiner* — Bruce H Hess
*Assistant Examiner* — Christopher Polley
(74) *Attorney, Agent, or Firm* — Calfee, Halter & Griswold LLP

(57) ABSTRACT

A roofing underlayment comprising an asphalt-coated fibrous sheet having an upper surface and a lower surface is provided. A first portion of the upper surface has granules adhered thereto. A slip-resistant member is bonded to a second portion of the upper surface, an upper surface of the slip-resistant member having substantially no granules adhered thereto.

11 Claims, 3 Drawing Sheets

(56) References Cited

U.S. PATENT DOCUMENTS

| | | | |
|---|---|---|---|
| 3,904,793 | A | 9/1975 | Priester, Jr. et al. |
| 4,138,521 | A | 2/1979 | Brown |
| 4,243,715 | A | 1/1981 | Gordon |
| 4,472,328 | A | 9/1984 | Sugimoto et al. |
| 4,490,493 | A | 12/1984 | Mikols |
| 4,522,673 | A | 6/1985 | Fell et al. |
| 4,636,414 | A | 1/1987 | Tajima et al. |
| 4,777,073 | A | 10/1988 | Sheth |
| 4,831,746 | A | 5/1989 | Kim et al. |
| 4,913,774 | A | 4/1990 | Goguelin |
| 4,934,465 | A | 6/1990 | Bailey et al. |
| 4,992,315 | A | 2/1991 | Zickell et al. |
| 5,038,693 | A | 8/1991 | Kourtides et al. |
| 5,102,728 | A | 4/1992 | Gay et al. |
| 5,280,064 | A | 1/1994 | Hesp et al. |
| 5,284,700 | A | 2/1994 | Strauss et al. |
| 5,308,692 | A | 5/1994 | Kennedy et al. |
| 5,401,588 | A | 3/1995 | Garvey et al. |
| 5,569,423 | A | 10/1996 | Belunova et al. |
| 5,601,629 | A | 2/1997 | Helbing |
| 5,654,060 | A | 8/1997 | Holman et al. |
| 5,658,972 | A | 8/1997 | Grzybowski et al. |
| 5,687,517 | A | 11/1997 | Wiercinski et al. |
| 5,813,176 | A | 9/1998 | Tzeng et al. |
| 5,916,654 | A | 6/1999 | Phillips et al. |
| 5,925,695 | A | 7/1999 | Ohtsuka et al. |
| 5,965,257 | A | 10/1999 | Ahluwalia |
| 5,972,166 | A | 10/1999 | Helwig et al. |
| 6,058,583 | A | 5/2000 | Takeuchi et al. |
| 6,171,443 | B1 | 1/2001 | Goettmann et al. |
| 6,235,364 | B1 | 5/2001 | Katsuro et al. |
| 6,267,843 | B1 | 7/2001 | Helwig et al. |
| 6,296,912 | B1 | 10/2001 | Zickell et al. |
| 6,308,482 | B1 | 10/2001 | Strait |
| 6,326,060 | B1 | 12/2001 | Ogawa |
| 6,365,001 | B1 | 4/2002 | Helwig et al. |
| 6,378,259 | B1 | 4/2002 | Carlson |
| 6,385,934 | B1 | 5/2002 | Zickell et al. |
| 6,497,787 | B1 | 12/2002 | Geel |
| 6,500,560 | B1 | 12/2002 | Kiik et al. |
| 6,517,676 | B1 | 2/2003 | Mathur |
| 6,531,200 | B2 | 3/2003 | Zickell et al. |
| 6,586,353 | B1 | 7/2003 | Kiik et al. |
| 6,641,896 | B2 | 11/2003 | Fensel et al. |
| 6,696,125 | B2 | 2/2004 | Zanchetta et al. |
| 6,720,067 | B2 | 4/2004 | Takahashi et al. |
| 6,811,649 | B2 | 11/2004 | Pfeffer |
| 6,844,057 | B2 | 1/2005 | Dichiara, Jr. |
| 6,844,091 | B2 | 1/2005 | Denham et al. |
| 6,925,766 | B2 | 8/2005 | DiPede |
| 6,968,662 | B2 | 11/2005 | Rodrigues |
| 7,115,313 | B2 | 10/2006 | Zanchetta et al. |
| 7,132,143 | B2 | 11/2006 | Zanchetta et al. |
| 7,140,153 | B1 | 11/2006 | Humphreys et al. |
| 7,563,733 | B2 | 7/2009 | Ahluwalia et al. |
| 7,634,877 | B2 | 12/2009 | Wiercinski |
| 8,062,985 | B2 | 11/2011 | Collier |
| 8,178,449 | B2 | 5/2012 | LaVietes et al. |
| 2002/0081924 | A1 | 6/2002 | Fensel et al. |
| 2002/0092634 | A1 | 7/2002 | Rokman et al. |
| 2003/0054717 | A1 | 3/2003 | Ahluwalia |
| 2003/0099833 | A1 | 5/2003 | Erb, Jr. et al. |
| 2003/0109190 | A1 | 6/2003 | Geel |
| 2003/0148693 | A1 | 8/2003 | Erb, Jr. et al. |
| 2003/0175478 | A1 | 9/2003 | Leclercq |
| 2003/0176125 | A1 | 9/2003 | Ahluwalia |
| 2003/0224679 | A1 | 12/2003 | Ahluwalia |
| 2003/0228460 | A1 | 12/2003 | Ahluwalia |
| 2004/0016502 | A1 | 1/2004 | Jones |
| 2004/0038065 | A1 | 2/2004 | Francis et al. |
| 2004/0055240 | A1 | 3/2004 | Kiik et al. |
| 2004/0071927 | A1 | 4/2004 | Murphy et al. |
| 2004/0116022 | A1 | 6/2004 | Langley et al. |
| 2004/0148887 | A1 | 8/2004 | DiPede |
| 2004/0161569 | A1 | 8/2004 | Zanchetta et al. |
| 2004/0161570 | A1 | 8/2004 | Zanchetta et al. |
| 2005/0031843 | A1 | 2/2005 | Robinson et al. |
| 2005/0097857 | A1 | 5/2005 | Mehta et al. |
| 2005/0171223 | A1 | 8/2005 | Thagard, III et al. |
| 2005/0208851 | A1 | 9/2005 | Gooliak |
| 2006/0078753 | A1 | 4/2006 | Bomberg et al. |
| 2006/0118992 | A1 | 6/2006 | Chang et al. |
| 2006/0228963 | A1 | 10/2006 | Souther et al. |
| 2006/0286347 | A1 | 12/2006 | Mehta et al. |
| 2007/0011978 | A1* | 1/2007 | Kalkanoglu ............ B32B 5/24 52/518 |
| 2007/0042158 | A1* | 2/2007 | Belt .................... B32B 3/10 428/143 |
| 2007/0044397 | A1 | 3/2007 | Wiercinski et al. |
| 2007/0044407 | A1 | 3/2007 | Elliott |
| 2007/0044410 | A1 | 3/2007 | Kalkanoglu |
| 2007/0071946 | A1 | 3/2007 | Zickell et al. |
| 2007/0137130 | A1 | 6/2007 | Zickell et al. |
| 2007/0178784 | A1 | 8/2007 | Jones et al. |
| 2008/0014814 | A1 | 1/2008 | Geel |
| 2008/0155923 | A1 | 7/2008 | Teng et al. |
| 2008/0166533 | A1 | 7/2008 | Jones et al. |
| 2008/0227353 | A1 | 9/2008 | Klingelhage et al. |
| 2008/0233325 | A1 | 9/2008 | Pahl et al. |
| 2008/0286517 | A1 | 11/2008 | Zickell |
| 2008/0289289 | A1 | 11/2008 | Wiercinski et al. |
| 2009/0042471 | A1 | 2/2009 | Cashin et al. |
| 2009/0277126 | A1 | 11/2009 | Wollert et al. |
| 2010/0119784 | A1 | 5/2010 | Zickell et al. |
| 2010/0233408 | A1 | 9/2010 | Zickell |
| 2011/0104461 | A1 | 5/2011 | Grubka |

FOREIGN PATENT DOCUMENTS

| | | |
|---|---|---|
| WO | 02/006605 | 1/2002 |
| WO | 2006/007168 | 1/2006 |
| WO | 2006/087426 | 8/2006 |
| WO | 2007/019399 | 2/2007 |

OTHER PUBLICATIONS

Office action from U.S. Appl. No. 11/238,371 dated Apr. 28, 2009.
Interview Summary from U.S. Appl. No. 11/238,371 dated Jul. 22, 2009.
Office action from U.S. Appl. No. 11/238,371 dated Oct. 15, 2009.
Advisory action from U.S. Appl. No. 11/238,371 dated Jan. 27, 2010.
Office action from U.S. Appl. No. 11/238,371 dated Mar. 22, 2010.
Office action from U.S. Appl. No. 11/238,371 dated Oct. 20, 2010.
Office action from U.S. Appl. No. 11/238,371 dated Jun. 23, 2011.
Office action from U.S. Appl. No. 11/238,371 dated Dec. 15, 2011.
Advisory action from U.S. Appl. No. 11/238,371 dated Apr. 3, 2012.
Office action from U.S. Appl. No. 11/238,371 dated May 23, 2013.
Office action from U.S. Appl. No. 11/291,634 dated Dec. 22, 2008.
Interview Summary from U.S. Appl. No. 11/291,634 dated Aug. 4, 2009.
Office action from U.S. Appl. No. 12/692,084 dated Jul. 20, 2011.
Office action from U.S. Appl. No. 12/692,084 dated Nov. 10, 2011.
Office action from U.S. Appl. No. 12/692,084 dated May 23, 2013.
Office action from U.S. Appl. No. 12/692,084 dated Nov. 8, 2013.
Advisory Action from U.S. Appl. No. 12/692,084 dated Feb. 28, 2014.
Office action from U.S. Appl. No. 12/731,706 dated Aug. 20, 2010.
Office action from U.S. Appl. No. 12/731,706 dated Apr. 1, 2011.
Office action from U.S. Appl. No. 12/731,706 dated Jun. 14, 2012.
Office action from U.S. Appl. No. 12/731,706 dated Nov. 8, 2012.
Office action from U.S. Appl. No. 12/892,629 dated Apr. 24, 2013.
Office action from U.S. Appl. No. 12/985,072 dated Oct. 16, 2012.
International Search Report and Written Opinion from PCT/US08/57609 dated Jul. 1, 2008.
Office action from Canadian Application No. 2,550,172 dated Oct. 9, 2012.
Office action from U.S. Appl. No. 14/247,306 dated Apr. 19, 2016.

* cited by examiner

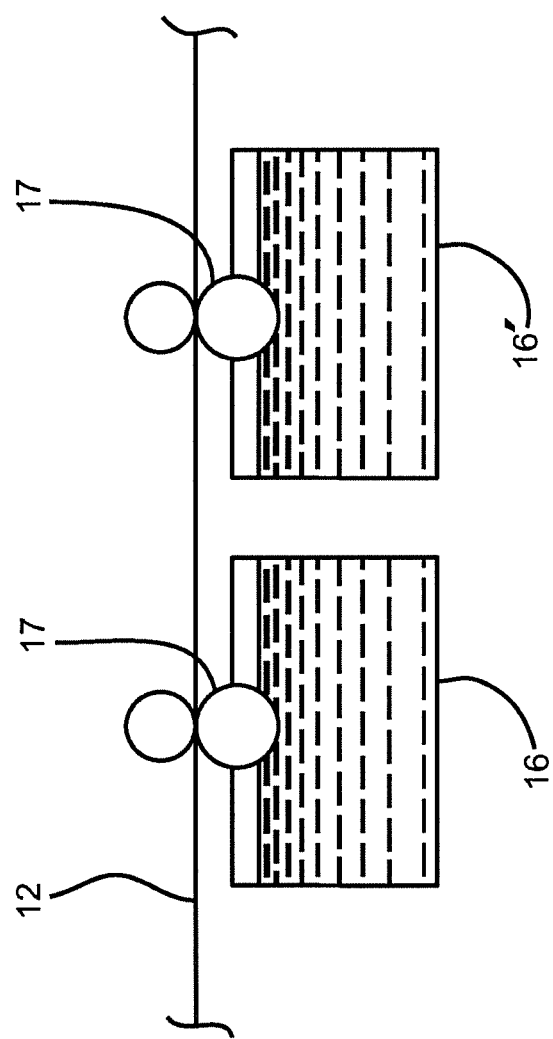

UNDERLAYMENT WITH SLIP-RESISTANT SURFACE

RELATED APPLICATIONS

This application is a divisional application of U.S. application Ser. No. 12/892,629, filed Sep. 28, 2010, titled UNDERLAYMENT WITH SLIP-RESISTANT SURFACE, which claims the benefit of U.S. Provisional Application No. 61/246,203, filed Sep. 28, 2009, the entire disclosures of which are both incorporated herein by reference.

BACKGROUND OF THE INVENTION

Various embodiments of an underlayment for use on a roof are described herein. In particular, the embodiments described herein relate to an improved underlayment In a typical roofing installation using asphalt shingles, an underlayer or underlayment is first applied to the plywood deck of the roof. The underlayment may take the form of an asphalt saturated paper which is useful as a waterproofing member. Roofing shingles are applied on top of the underlayment with the seams of adjacent rows positioned in an offset relationship. In practice, a starter row or strip is begun at the roof eaves using self-sealing shingles. The end of the first shingle in the strip is trimmed such that, when it is placed on the deck, the cutouts of the first course of shingles will not be placed over the starter strip joints. The starter strip and the shingles are nailed to the roof. Successive rows of shingles are then secured to the deck or roof using nails.

An underlayment may have granules embedded in an asphaltic composition. When positioned on an upper surface of the paper or membrane, the granules provide a high-traction surface upon which a roofing installer can walk. Such membranes also offer reinforcement and/or structural integrity, and allow lap sealing. Some of the granules however, may not become embedded into the asphalt material, thereby providing some amount of undesirable loose granules. Further, some embedded granules may become loose by the foot traffic of the roof installer.

SUMMARY OF THE INVENTION

The above objects as well as other objects not specifically enumerated are achieved by a roofing underlayment comprising an asphalt-coated fibrous sheet having an upper surface and a lower surface. A first portion of the upper surface has granules adhered thereto. A slip-resistant member is bonded to a second portion of the upper surface, an upper surface of the slip-resistant member having substantially no granules adhered thereto.

According to this invention there is also provided a roofing underlayment comprising an asphalt-coated fibrous sheet having an upper surface and a lower surface. A first portion of the upper surface has granules adhered thereto. A slip-resistant member is bonded to a second portion of the upper surface, an upper surface of the slip-resistant member having fine abrasive particles adhered thereto.

According to this invention there is also provided a roofing underlayment comprising an asphalt-coated fibrous sheet having an upper surface and a lower surface. A first portion of the upper surface has granules adhered thereto. A second portion of the upper surface includes a plurality of fine abrasive particles embedded in the asphalt-coated surface thereof.

According to this invention there is also provided a method of making a roofing underlayment. The method includes the steps of coating a fibrous sheet with asphalt to define an asphalt-coated fibrous sheet having an upper surface and a lower surface, adhering a slip-resistant member to a portion of the upper surface of the asphalt-coated fibrous sheet, covering the asphalt-coated fibrous sheet and optionally covering the slip-resistant member, with granules to define a granule coated underlayment.

Other advantages of the roofing underlayment will become apparent to those skilled in the art from the following detailed description, when read in light of the accompanying drawings.

BRIEF DESCRIPTION OF THE DRAWINGS

FIG. 3 is a schematic elevational view of a portion of an alternate embodiment of the apparatus illustrated in FIG. 1.

DETAILED DESCRIPTION OF THE INVENTION

The present invention will now be described with occasional reference to the specific embodiments of the invention. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise.

Unless otherwise indicated, all numbers expressing quantities of ingredients, properties such as molecular weight, reaction conditions, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

As used in the description of the invention and the appended claims, the word/phrase "axially oriented" is defined as running longitudinally in the machine direction, as indicated by the arrows 34.

Figure 1:
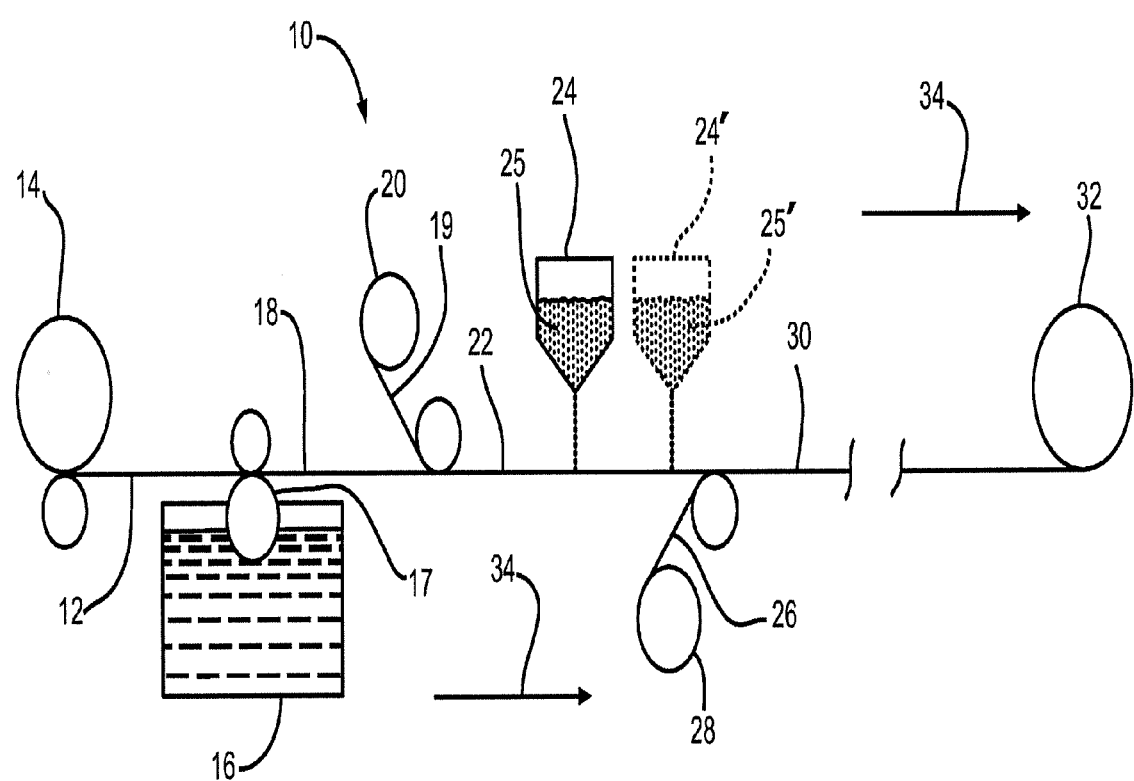
FIG. 1 is a schematic elevational view of an apparatus for making shingles according to the invention.

Referring now to the drawings, there is shown schematically in FIG. 1 an apparatus 10 for manufacturing an asphalt-based roofing material or underlayment 30 according to the invention. In the illustrated embodiment, the manufacturing process involves passing a continuous sheet 12 in a machine direction (indicated by the arrows 34) through a series of manufacturing operations. The sheet may move at any desired speed.

In a first step of the illustrated manufacturing process, a continuous sheet of substrate or underlayment mat 12 is payed out from a roll 14. The substrate can be any type suitable for use in reinforcing asphalt-based roofing materials, such as a non-woven web of glass or polymer fibers. The illustrated underlayment mat 12 is about 36 inches wide. Alternatively, the underlayment mat 12 may have any other desired width.

The underlayment mat 12 may be fed through a coater 16 where an asphalt coating is applied to the mat 12. The asphalt coating can be applied in any suitable manner. In the illustrated embodiment, the mat 12 contacts a roller 17, which is in contact with a supply of hot, melted asphalt. The roller 17 completely covers the mat 12 with a tacky coating of hot, melted asphalt to define a first asphalt coated sheet 18. In other embodiments, however, the asphalt coating could be sprayed on, rolled on, or applied to the sheet by other means. The material of the asphalt coating may comprise a mixture of asphalt and other desired materials, such as a mixture of styrene-butadiene-styrene (SBS) and asphalt. The asphalt material may be filled with a material such as crushed dolomite, calcite limestone, and the like, amounting to at least about 50 percent by weight of the asphalt/filler combination.

It will be understood that more than one layer of asphalt coating may be applied to the underlayment mat 12. Accordingly, the manufacturing process may require that the underlayment mat 12 be fed through more than one coater, such as the coaters 16 and 16' shown in FIG. 3.

One or more strips of a slip-resistant material, such as film or slip-resistant tape 19, as will be described in detail herein, may then be payed out from a roll 20. In the embodiment illustrated in FIG. 1, the tape 19 is provided from a continuous roll. Alternatively, the tape 19 by be provided in discontinuous portions, and applied to the first asphalt coated sheet 18.

The slip-resistant tape 19 adheres to the first asphalt coated sheet 18 to define a second asphalt coated sheet 22. In one embodiment, the slip-resistant tape 19 is attached to the sheet 18 by the adhesive properties of the asphalt in the first asphalt coated sheet 18. The slip-resistant tape 19, however, may be attached to the sheet 18 by any suitable means, such as other adhesives. In one embodiment, the slip-resistant tape 19 is formed from polyester. In another embodiment, the slip-resistant tape 19 is formed from polyolefin, such as polypropylene or polyethylene. The slip-resistant tape 19, however, can be formed from any material suitable for defining a slip-resistant surface on an underlayment, such as, for example, paper, film, scrim material, and woven or non-woven glass or polymer fibers, or a blend of the foregoing.

The slip-resistant tape 19 includes an upper surface to which granules substantially will not adhere. Alternatively, a tape that provides improved traction may be provided in lieu of the slip-resistant tape 19. For example, a tape that consists of fine abrasive particles bonded by a tough, durable polymer to a dimensionally stable plastic film may be used. One example of such a tape is SAFETY-WALK™ tape manufactured by the 3M™ Corporation.

The resulting second asphalt-coated fibrous sheet or second asphalt coated sheet 22 may then be passed beneath one or more granule dispensers 24 for the application of granules 25 to the portion of the upper surface of the second asphalt coated sheet 22 not covered by the slip-resistant tape 19. The granules 25 will not adhere to the slip-resistant tape 19, but will adhere to the exposed portion of the asphalt coated sheet 22. In the illustrated embodiment, the portion of the asphalt coated sheet 22 to which granules 25 are adhered defines a first portion 38 of the upper surface of the second asphalt coated sheet 22. Similarly, the portion of the asphalt coated sheet 22 to which the slip-resistant tape 19 is adhered defines a second portion 40 of the upper surface of the second asphalt coated sheet 22.

In yet another embodiment, the axially oriented second portions 40 of the asphalt coated sheet 22 may be provided with fine abrasive particles or sand 25' in lieu of the slip-resistant tape 19. For example, fine abrasive particles 25' having a grit size within the range of from about 36 to about 54, may be used. The particles 25' may be applied by one or more granule or particle dispensers 24' to the second portions 40 of the upper surface of the second asphalt coated sheet 22. In such an embodiment, the fine abrasive particles 25' in the second portions 40 provide a greater slip-resistance relative to the first portion 38 of the upper surface of the second asphalt coated sheet 22.

In one embodiment, the slip-resistant tape 19 is about 1.25 inches wide. Alternatively, the slip-resistant tape 19 may have a width within the range of from about ½ inches to about 4 inches. In the one embodiment, the slip-resistant tape 19 is formed from 148 gage polyester.

As shown in FIG. 1, a continuous release sheet 26 may be then be payed out from a roll 28, and applied to a lower surface of the second asphalt coated sheet 22. The release sheet 26 may be any desired release sheet, such as a paper or plastic film having a siliconized surface. The release sheet 26 prevents the underlayment 30 from adhering to itself when arranged in the roll 32. The release sheet may be removed by a roof installer so that the bottom surface, or surface opposite the granule coated surface of the underlayment 30, will adhere to a roof deck, a portion of which is illustrated at 42 in FIG. 2, during installation of the underlayment on a roof.

After all the granules 25 are deposited on the second asphalt coated sheet 22 by one or more dispensers 24, and after the release sheet 26 is applied, the sheet 22 becomes an underlayment 30. The underlayment 30 is then collected on a drum or roll 32 for shipment.

Figure 2:
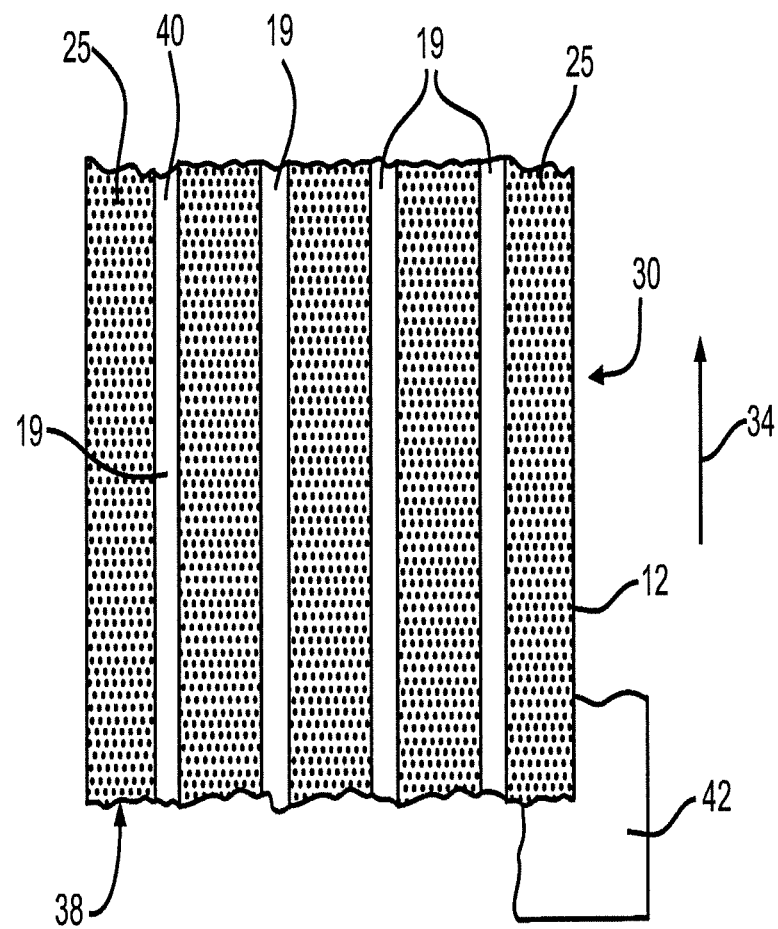
FIG. 2 is a plan view of an underlayment having slip-resistant members in accordance with this invention.

As best shown in FIG. 2, the underlayment 30 includes a plurality of longitudinally arranged slip-resistant tapes 19 adhered to the upper surface of the underlayment 30. In the illustrated embodiment, there are four tapes 19 applied to the upper surface of the underlayment 30. Alternatively, any other number of tapes 19 may be applied to the upper surface of the underlayment 30, such as one tape 19, two tapes 19, or between three and eight tapes 19.

Each tape 19 defines a region that is free of granules 25. Advantageously, the granule free regions of the underlayment 30 defined by the slip-resistant tapes 19 provide the roofing installer with a roofing underlayment 30 having relatively greater slip resistance than the portions of the underlayment 30 with granules 25, but without the slip-resistant tape 19.

When installed between a roof deck 42 and any of asphalt shingles, cedar shakes, concrete tile, slate roofing, and other roofing material, the underlayment 30 helps to lock out damage from wind-driven rain and ice damming.

The slip-resistant tapes 19 described above may be applied to any underlayment material which includes granules embedded in its upwardly facing surface, such as WEATHERLOCK® G underlayment material, sold by Owens Corning, Toledo, Ohio.

Advantageously, as roofing installers walk across the granule coated surface of the underlayment 30 described above, the slip-resistant tapes 19 provide granule-free portions upon which the roofing installers may have improved slip resistance.

In one embodiment, when the slip-resistant tapes 19 adhere to the asphalt coating on the mat 12, ridges of asphalt coating may be formed along the edges of the slip-resistant tapes 19. The ridges extend outwardly of the surface of the mat 12 and may provide a roughness on the surface of the mat 12 that further improves slip resistance for the roofing installers.

The principle and mode of operation of the roofing underlayment have been described in its preferred embodiment. However, it should be noted that the roofing underlayment described herein may be practiced otherwise than as specifically illustrated and described without departing from its scope.

What is claimed is:

1. A roofing underlayment comprising:
   an asphalt-coated fibrous sheet having an upper asphaltic surface and a lower asphaltic surface;
   a plurality of granules adhered to a first portion of the upper asphaltic surface; and
   a plurality of slip resistant tape members directly bonded to a second portion of the upper asphaltic surface and arranged longitudinally and substantially parallel with a central longitudinal axis of the underlayment;
   wherein the plurality of slip resistant tape members includes a first slip resistant tape member disposed entirely on a first side of the central longitudinal axis of the underlayment, proximate a front edge of the underlayment, a second slip resistant tape member disposed entirely on a second side of the central longitudinal axis of the underlayment, proximate a rear edge of the underlayment, a third slip resistant tape member disposed entirely on the first side of the central longitudinal axis of the underlayment, spaced apart from the first slip resistant tape member and proximate the central longitudinal axis of the underlayment, and a fourth slip resistant tape member disposed entirely on the second side of the central longitudinal axis of the underlayment, spaced apart from the second slip resistant tape member and proximate the central longitudinal axis of the underlayment.

2. The roofing underlayment of claim 1, wherein the plurality of slip resistant tape members comprises between four and eight slip resistant tape members.

3. The roofing underlayment of claim 1, wherein each of the plurality of slip resistant tape members include an upper surface having substantially no granules adhered thereto.

4. The roofing underlayment of claim 1, wherein each of the plurality of slip resistant tape members has a width within the range of from about ½ inch to about 4 inches.

5. The roofing underlayment of claim 1, wherein each of the plurality of slip resistant tape members includes an upper surface having fine abrasive particles adhered thereto.

6. The roofing underlayment of claim 1, wherein each of the plurality of slip resistant tape members is formed from a material selected from the group consisting of a polyester film, a polyolefin film, a paper strip, a scrim material, a woven glass, a non-woven glass, a woven polymer and a nonwoven polymer material.

7. The roofing underlayment of claim 1, further comprising ridges of asphalt coating material formed along edges of each of the plurality of slip resistant tape members.

8. The roofing underlayment of claim 1, wherein the asphalt-coated fibrous sheet is substantially rectangular.

9. The roofing underlayment of claim 1, wherein the roofing underlayment is symmetrical about the central longitudinal axis.

10. The roofing underlayment of claim 1, further comprising a release sheet applied to the lower asphaltic surface of the asphalt-coated fibrous sheet.

11. The roofing underlayment of claim 1, wherein the lower asphaltic surface of the asphalt-coated fibrous sheet defines a bottommost surface of the roofing underlayment.

* * * * *